United States Patent

[11] 3,563,389

| [72] | Inventors | Joseph Mizrahi;<br>Eli Barnea, Haifa, Israel |
|---|---|---|
| [21] | Appl. No. | 828,988 |
| [22] | Filed | May 29, 1969 |
| [45] | Patented | Feb. 16, 1971 |
| [73] | Assignee | Israel Mining Industries-Institute for<br>Research and Development<br>Haifa, Israel |
| [32] | Priority | July 3, 1968 |
| [33] | | Israel |
| [31] | | 30304 |

[54] GRAVITATIONAL SETTLER VESSEL
8 Claims, 6 Drawing Figs.

[52] U.S. Cl................................................. 210/521,
210/532, 210/540
[51] Int. Cl................................................. B01d 21/00
[50] Field of Search............................................ 210/303,
320, 521, 522, 532, 540

[56] References Cited
UNITED STATES PATENTS
1,709,676  4/1929  Martyn.......................... 210/521X

| 2,357,500 | 9/1944 | Cann.......................... | 210/305 |
| 2,467,003 | 4/1949 | Bach.......................... | 210/521X |
| 2,673,451 | 3/1954 | Gariel......................... | 210/521X |
| 3,412,861 | 11/1968 | Rubbach et al............... | 210/320X |

FOREIGN PATENTS
386,312  1/1933  Great Britain................  210/521

*Primary Examiner* — John Adee
*Attorney* — Kirschstein, Kirschstein & Ottinger

ABSTRACT: A gravitational settler vessel for use in combination with a mixer. The settler vessel is adapted for the separation of a liquid-liquid dispersion in which the dispersed phase amounts to 10 to 70 percent by volume of the total dispersion. It comprises a settling chamber, at least two stacks of sloping, vertically spaced plates, and at the two sides of each such stack there are vertical channels, one of which serves for conducting the ascending lighter phase to a light phase-collecting chamber and the other for conducting the descending heavier phase to the heavy phase-collecting chamber. The vertical channels may be formed either between two vicinal stacks or between a stack and a sidewall of the settling chamber.

Inventor
JOSEPH MIZRAHI
ELI BARNEA

Attorney

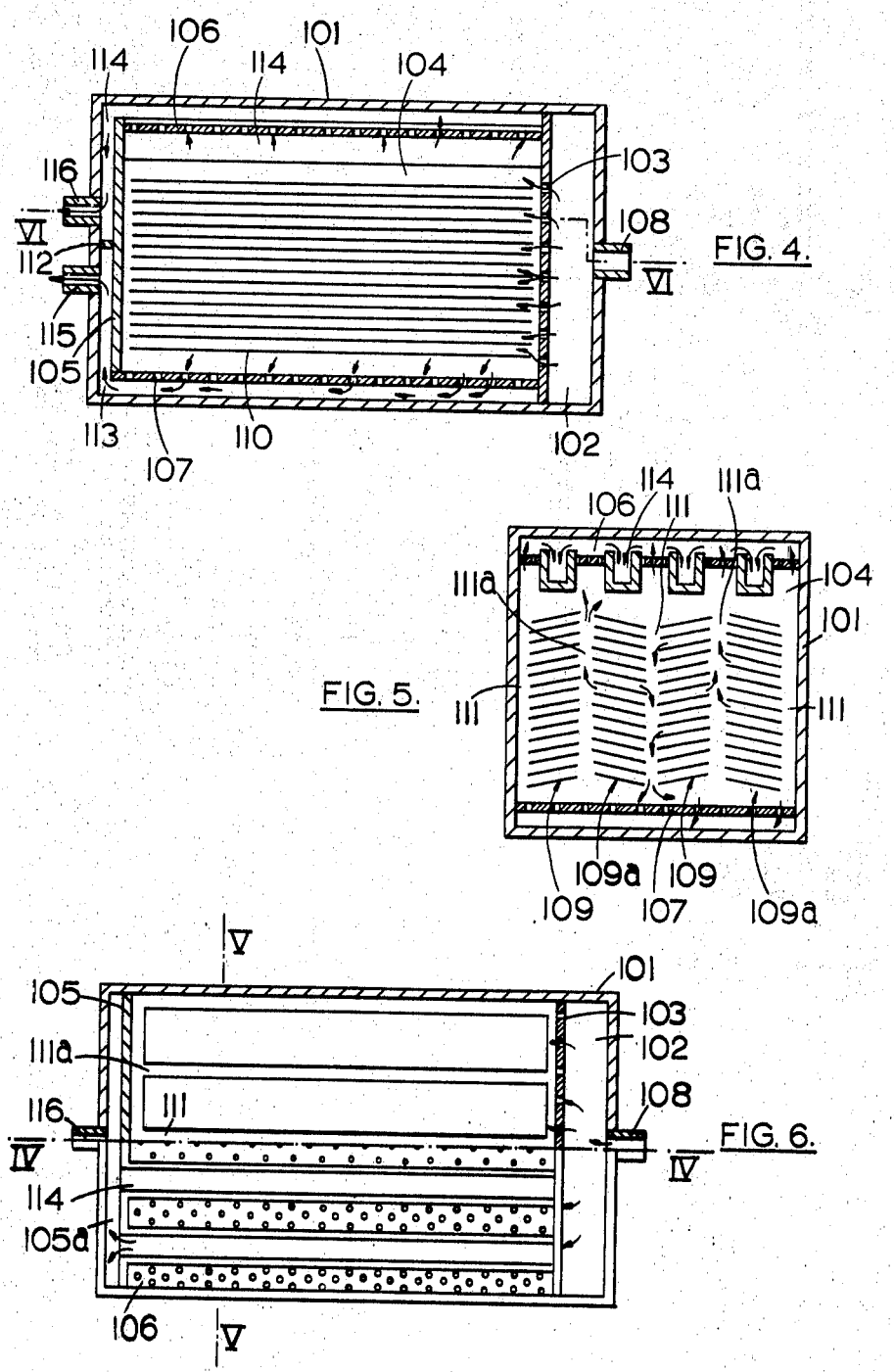

GRAVITATIONAL SETTLER VESSEL

The present invention concerns a separation vessel of the gravitational settler type for the separation of two mutually immiscible liquids of different specific gravities from a dispersion of the one liquid in the other one.

In the course of various processes it becomes necessary to bring about an intimate contact between two mutually immiscible liquids. This is done by agitation or turbulent flow, whereby one of the liquids is dispersed in the other one. The intensive agitation or turbulent flow generally makes the subsequent separation of the two liquid phases difficult owing to the small size and great stability of the droplets of the dispersed phase. In consequence, the separation is very slow and requires large vessels.

Such phase separation can present different problems according to the nature of the dispersion, for example:

a. When a dispersion containing a small volumetric fraction of the dispersed phase (say less than 5 percent) is introduced in a gravitational settler, the main physical mechanism controlling the rate of separation is the free settling of the individual droplets.

Known approaches to improve gravitational settlers for this type of problem have been in two forms. By one approach, the total settling distance of the individual droplets of dispersed phases from the bulk of the stream to the collecting interface is reduced by various means. In some practical systems, such as packed beds of granular or fibrous materials through which the dispersion is passed, a collecting film of dispersed phase is formed on the preferentially wetted solid substrate, and this film is again torn into larger drops, which are easily separated. These devices act as precoalescers and depend mainly on the large specific area and narrow channels of the packed beds. Other proposed systems make the suspension to flow through a labyrinth of baffles, taking advantage of various hydrodynamic mechanisms of separation (inertial, boundary layer, etc.). In principle, all these separation mechanisms are similarly used in separation of dust or mist from gases. For most purposes, these devices are so operated as to give a concentrated dispersion of the dispersed phase in one stream and a cleaner continuous phase in the other stream, i.e. as thickeners rather than as separators (coalescers).

By the other approach, the free-settling velocity is increased by applying a centrifugal or electrical field.

b. When the dispersions contain a major volumetric fraction of dispersed phase (10—70 percent), the main physical mechanism controlling the rate of separation of the settler is the coalescence of the dispersed drops, packed in the intermediate layer of the gravitational settler, by drop-to-drop coalescence and drop-to-interface coalescence. The mechanism of these coalescence phenomena, in bulk systems of millions of drops, is very complicated and little known at present, and no improvement of gravitational settlers, operating in these conditions, has been claimed to change significantly the coalescence regime of the intermediate packed layer in the gravitational settlers. All improvements proposed up to now have been concerned with design features aiming at eliminating detrimental effects of the turbulence and kinetics of the inlet and outlet phases on the coalescence in the intermediate packed layer in the gravitational settler.

It is an object of the present invention to provide an improved gravitational settler capable of faster separation of the phases than known gravitational settlers used for the purpose set out in para b) above.

The invention provides a gravitational settler for the separation of the two phases of dispersions of mutually immiscible liquids of different specific gravities where the dispersed phase amounts to 10 to 70 per cent by volume of the total dispersion; which settler comprises an inlet header, a settling chamber, an upper lightphase-collecting chamber and a lower heavy phase-collecting chamber; at least two stacks of sloping, vertically spaced plates located within the settling chamber and so disposed that on one side of each stack there exists a vertical collecting channel towards which the plates of the stack slope downwardly, and at the opposite side of the same stack there exists a vertical collecting channel towards which the plates of the stacks slope upwardly; a vertical partition perforated at least in a region coextensive with a middle zone of the stacks, separating the inlet header from the settling chamber; and perforated, substantially horizontal partitions separating the bottom region of the settling chamber from the heavy phase-collecting chamber and the top region of the settling chamber from the light phase-collecting chamber.

By the sloping plates a large part of the settling chamber is divided into a number of small spaces delimited by the plates, whereby the overall rate of coalescence of droplets increases very significantly and the separation capacity of the whole settler is improved.

The partition between the header and settling chamber acts as a coalescence inducer and, as such, operates in a similar way as the diffuser described, for example, in Israel Pat. Specification No. 23,539. Furthermore, it distributes the dispersion to the spaces between the plates of the stacks, especially at the median levels thereof.

Finally, this partition may serve to slow down the flow of the incoming dispersion, and for this purpose the aggregate cross section of flow of its perforation should preferably be larger than that of the conduit through which the dispersion is fed to the header.

In an analogous manner the partition between the settling chamber and the two phase-collecting chambers have the task to decrease the linear velocities of flow of the separated phases, where these tend to become too large and thereby to affect adversely the stability of the settling operation and to aspirate a part of either separated phase back into the other phase.

In practice, the linear flow velocity may be about 1 to 10 cm./sec. within the spaces between the plates of the stacks, about 10 to 100 cm./sec. in the vertical collecting channels, and lower than either of these in the region of the inlet and outlet partitions.

The perforations of all these partitions may have any desired shape. They may be round or elliptic holes, oblong slots or the like, or the partitions may be designed as louver boards, or the like.

Owing to the inclination of the plates there occurs in the spaces between them a countercurrent migration of the separating phases, the lighter one ascending towards the vertical collecting channel located at the upper ends of the plates, while the heavier phase descends towards the vertical collecting channel located at lower ends of the plates.

Between the two oppositely flowing separated phases in each of the spaces between the plates there exists a packed layer of the unseparated dispersion.

From the vertical collecting channel or channels where the lighter phase collects, this phase rises toward the upper partition and passes into the upper collecting chamber. Similarly, from the vertical collecting channels where the heavier phase collects, this phase descends to the lower partition and passes into the lower collecting chamber. From the collecting chamber the phases are withdrawn in the desired manner.

The separating capacity of the settler according to the invention is the greater, the smaller the vertical distance between consecutive plates of the stacks. However, this distance must not be too small. It has been found that distances from 5 to 60 mm., and preferably from 10 to 40 mm. are particularly suitable. Moreover, the distance between consecutive plates should preferably be related to the total height of the stack, a preferred ratio being from 1:10 to 1:100.

It also appears that in practice, the width of the plates should also be related to the vertical distances between them and that an optimal performance of the settler is achieved if the width of the plates amounts to 5 to 20 times the vertical distance between each two consecutive plates.

In a preferred embodiment the settler has substantially cylindrical shape, the header has circular cross section and occupies the center of the settler, the settling chamber is disposed concentrically round the header, and the collecting chambers form a concentric jacket round the settling chamber, each of them occupying about half the height of the settler, and a plurality of stacks are disposed radially and have substantially circular sectorlike shape, with radial, substantially rectangular collecting channels between them.

By another embodiment, the settler is rectangular in plan, the stacks extend in either its longitudinal or its transverse direction, the header is located at one end of the stacks and the collecting chambers are located at the opposite end of the stacks.

The angle of slope of the plates should be from 2° to 40°, preferably from 5° to 15°.

It has been found that with a settler vessel according to the invention the separation is considerably faster than with conventional settler vessels. Accordingly, for an equal throughput a much smaller floor area is required. Experience has so far shown that where, for a throughput of 280 m³/h of a test dispersion, a conventional settler requires about 16 m² of floor space, the settler according to the invention needs as little as 3 m².

The invention is illustrated, by way of example only, in the accompanying drawings in which:

FIG. 4 is a vertical longitudinal section on line IV-IV of FIG. 6 of a settler according to a second embodiment of the invention;

FIG. 5 is a vertical cross section online V-V of FIG. 6; and

FIG. 6 is a plan view, partly in horizontal section on line VI-VI of FIG. 4.

Figure 1:
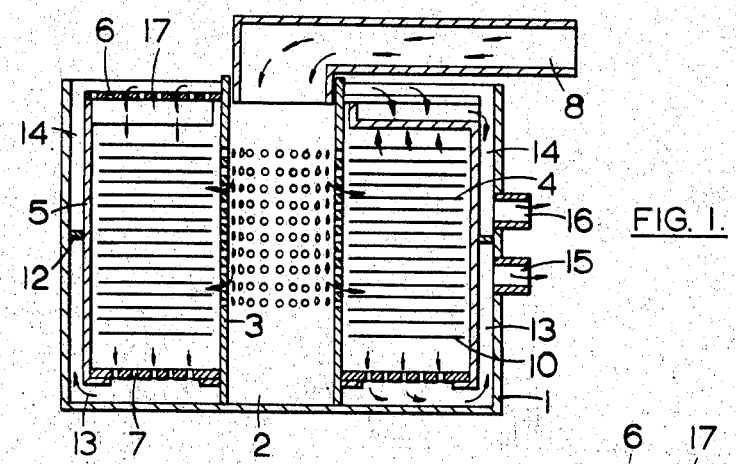
FIG. 1 is an axial section through a settler according to the invention taken along line I-I of FIG. 3.
Figure 2:
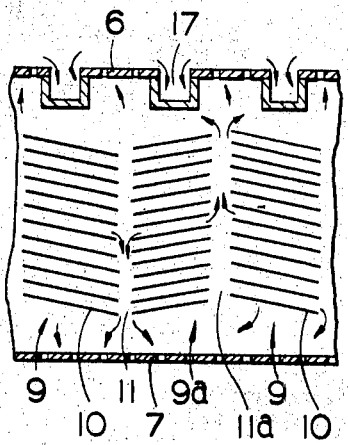
FIG. 2 is a fragmentary section thereof along line II-II of FIG. 3.
Figure 3:
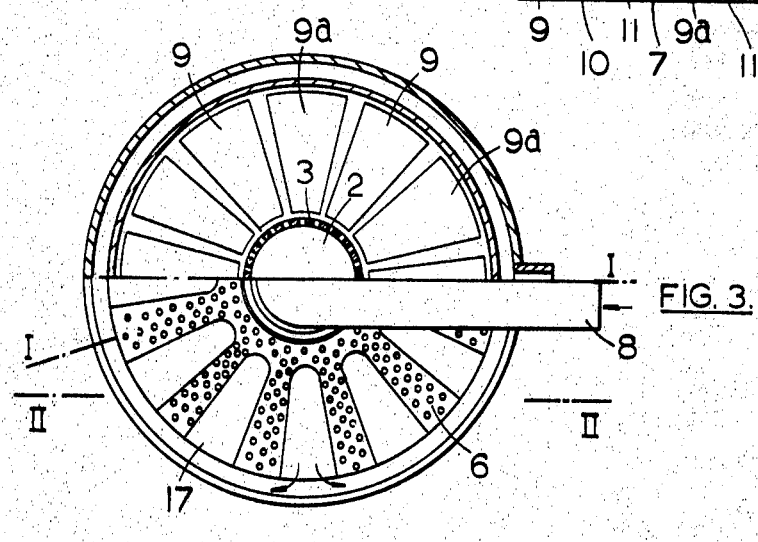
FIG. 3 is a plan view, partly in horizontal section, of the same settler.

The settler according to FIGS. 1 to 3 comprises a cylindrical vessel 1 in which there are formed: a header 2 of circular cross section delimited by a cylindrical perforated partition 3 which extends over the whole height of vessel 1 and has its perforation mainly in the middle; and annular settling chamber 4 formed between the partition 3, an unperforated cylindrical wall 5, and perforated top and bottom walls 6, 7 and a jacket space round the settling chamber. A feed conduit 8 opens into the header 2 for supplying it with the dispersion.

Within the settling chamber there are radially disposed stacks 9, 9a of plates 10, with vertical collecting channels 11, 11a between the stacks. The plates have opposite slopes in alternating stacks, so that the plates of two neighboring stacks 9, 9a slope downwardly towards the collecting channel 11 between them, and the plates of the same stack 9a and a next stack 9 slope upwardly towards the collecting channel 11a between them (FIG. 2).

The jacket space surrounding the settling chamber is divided by a horizontal wall 12 into a lower collecting chamber 13 extending round the lower half of the settling chamber and beneath its perforated bottom 7, and an upper collecting chamber 14 extending round the upper half of the settling chamber, which have outlet connections 15, 16 respectively. In the perforated top wall 6 of the settling chamber, unperforated radial depressions 17 are formed as gutters for collecting the lighter phase as it overflows through the top wall 6, and guiding it into the collecting chamber 14.

If, in this embodiment of the invention, in which the width of the plates increases from the center of the settler towards its periphery, a certain ratio between the width of the plates and their vertical distance from each other is to be maintained, it is the mean width of the plates that will be taken as the basis for calculation.

In operation the dispersion is fed to the header through the conduit 8 and is distributed therefrom to the stacks where it flows through the spaces between the plates as shown by the arrows in FIGS. 1 and 2. The lighter phase flows upwards in these spaces, enters the central collecting channels 11a and hence overflows through the top wall 6 into the gutters 17 and onwards into the collecting chamber 14 in order to be discharged from the latter through the outlet 16.

The heavier phase flows downwards within the spaces between the plates into the vertical collecting channels 11, then through the perforated bottom 7 into the lower collecting chamber 13 from where it is discharged through the outlet 15.

The settler according to FIGS. 4 to 6 comprises an oblong-rectangular vessel 101 in which there are formed: a header 102 of rectangular cross section between one end wall of the vessel 101 and a vertical transverse perforated partition 103 which extends over the whole height of vessel 101 and has its perforations mainly in the middle; and oblong-rectangular settling chamber 104 formed between the partition 103, and unperforated terminal partition 105 and perforated top and bottom walls 106, 107, and a draining space 105a at the end of the settling chamber formed between partition 105 and the facing end wall of vessel 101, and between the upper and lower perforated top and bottom walls 106, 107 and the top and bottom walls of vessel 101, respectively. A feed conduit 108 opens into the header 102 for supplying it with the dispersion.

Within the settling chamber there are four longitudinally disposed stacks 109, 109a of plates 110, with vertical collecting channels 111, 111a between them, as well as between the stacks and the longitudinal sidewalls of vessel 101. The plates have opposite slopes in alternating stacks, so that the plates of the two median stacks 109, 109a slope downwardly towards the median vertical collecting channel 111 between them, and upwardly towards the vertical collecting channels 111a between them and the outermost stacks, which in their turn slope downwards to the outermost vertical collecting channels 111.

The draining space is divided by a horizontal wall 112 into a lower collecting chamber 113 which is continued beneath the perforated bottom wall 107, and an upper collecting chamber 114, which is continued above the perforated top wall 106, which have outlet connections 115, 116 respectively. In the perforated top wall 106 of the settling chamber, unperforated radial depressions 114 are formed as gutters for collecting the lighter phase as it overflows through the top wall 106 and guiding it into the collecting chamber 114.

The operation of the settler according to this embodiment of the invention is analogous to that of the settler according to FIGS. 1 to 3.

We claim:

1. A gravitational settler for the separation of the two phases of dispersions of mutually immiscible liquids of different specific gravities where the dispersed phase amounts to 10 to 70 percent by volume of the total dispersion; which settler comprises an inlet header, a settling chamber, an upper light phase-collecting chamber and a lower heavy phase-collecting chamber; at least two stacks of sloping, vertically spaced plates located within the settling chamber and so disposed that on one side of each stack there exists a vertical collecting channel towards which the plates of the stack slope downwardly, and at the opposite side of the same stack there exists a vertical collecting channel towards which both plates of the stack slope upwardly; a vertical partition perforated at least in a region coextensive with a middle zone of the stacks, separating the inlet header from the settling chamber; and perforated, substantially horizontal partitions separating the bottom region of the settling chamber from the heavy phase-collecting chamber, and the top region of the settling chamber from the light phase-collecting chamber.

2. A settler according to claim 1, being a substantially cylindrical apparatus in which the header has circular cross section and occupies the center of the settler, the settling chamber is disposed concentrically round the header, the collecting chambers form a concentric jacket round the settling chamber, each of them occupying about half the height of the settler, and a plurality of stacks are disposed radially and have substantially circular sectorlike shape, with radial, substantially rectangular collecting channels between them.

3. A settler according to claim 1, being a substantially rectangular apparatus in which the stacks extend in either its longitudinal or its transverse direction, the header is located at one end of the stacks and the collecting chambers are located at the opposite end of the stacks.

4. A settler according to claim 1, wherein the angle of slope of the plates is from 2° to 40°, preferably from 5° to 15°.

5. A settler according to claim 1, wherein the aggregate cross section of flow of the partition between the header and settling chamber is larger than that of the conduit through which the dispersion is fed to the header.

6. A settler according to claim 1, wherein the distance between the plates of the stacks is from 5 to 60 mm., preferably from 10 to 40 mm.

7. A settler according to claim 1, wherein the width of the plates amounts to 5 to 20 times the vertical distance between each two consecutive plates of each stack.

8. A settler according to claim 1, wherein the distance between each two consecutive plates of a staCk is about one-hundredth to one-tenth of the total height of that stack.